United States Patent [19]
Seto et al.

[11] Patent Number: 5,923,314
[45] Date of Patent: Jul. 13, 1999

[54] IMAGE PROCESSING SYSTEM

[75] Inventors: Kunio Seto; Takahiro Kato, both of Tokyo; Kensaku Tanaka, Yokohama; Yukari Taniguchi, Chofu, all of Japan

[73] Assignee: Canon Kabushiki Kaisha, Tokyo, Japan

[21] Appl. No.: 08/279,081

[22] Filed: Jul. 22, 1994

Related U.S. Application Data

[63] Continuation of application No. 07/819,650, Jan. 10, 1992, abandoned, which is a continuation of application No. 07/405,068, Sep. 7, 1989, abandoned, which is a continuation of application No. 06/914,150, Oct. 1, 1986, abandoned.

[30] Foreign Application Priority Data

Oct. 7, 1985 [JP] Japan .................................. 60-222938

[51] Int. Cl.⁶ .................................................... G09G 5/00
[52] U.S. Cl. ........................... 345/113; 345/470; 345/192
[58] Field of Search ..................................... 345/115, 116, 345/113, 114, 133, 138, 139, 143, 144, 146, 902, 470, 352, 192, 194, 195, 141, 145; 395/119, 120, 121, 138

[56] References Cited

U.S. PATENT DOCUMENTS

| | | | |
|---|---|---|---|
| Re. 30,679 | 7/1981 | Evans et al. | 364/523 |
| 3,441,789 | 4/1969 | Harrison | 340/729 |
| 4,189,743 | 2/1980 | Schure | 340/747 |
| 4,204,208 | 5/1980 | McCarthy | 340/745 |
| 4,408,198 | 10/1983 | Kudirka | 340/730 |
| 4,531,120 | 7/1985 | Brownell | 340/745 |
| 4,556,959 | 12/1985 | Allen et al. | 345/902 |
| 4,584,573 | 4/1986 | Ito | 340/745 |
| 4,622,545 | 11/1986 | Atkinson | 340/747 |
| 4,636,870 | 1/1987 | Yamada et al. | 358/288 |
| 4,642,621 | 2/1987 | Nemoto | 340/721 |
| 4,648,062 | 3/1987 | Johnson et al. | 345/902 |
| 4,654,651 | 3/1987 | Kishi et al. | 340/731 |
| 4,686,521 | 8/1987 | Beaven et al. | 340/747 |
| 4,689,616 | 8/1987 | Goude et al. | 345/113 |
| 4,791,579 | 12/1988 | Kranitzky | 395/121 |

FOREIGN PATENT DOCUMENTS

| | | |
|---|---|---|
| 78103 | 4/1983 | European Pat. Off. . |
| 100097 | 8/1984 | European Pat. Off. . |
| 53-15624 | 5/1978 | Japan . |
| 53-41017 | 10/1978 | Japan . |
| 169281 | 10/1983 | Japan . |
| 2044050 | 8/1980 | United Kingdom . |
| 2099258 | 1/1982 | United Kingdom . |

OTHER PUBLICATIONS

F.W. Jansen, "Previewing Techniques in Raster Graphics", Computer & Graphics, vol. 8, No. 2, pp. 149–161, Aug., 1984.

*Primary Examiner*—Xiao Wu
*Attorney, Agent, or Firm*—Fitzpatrick, Cella, Harper & Scinto

[57] ABSTRACT

There is disclosed an image processing apparatus capable of forming white patterns on black background, hatched patterns, patterns with shadows, etc., in a simple manner. The apparatus has plural memories, which are used for defining mutually corresponding dots. These dots are subjected to logic processing, and the obtained dot patterns are released in combination.

12 Claims, 10 Drawing Sheets

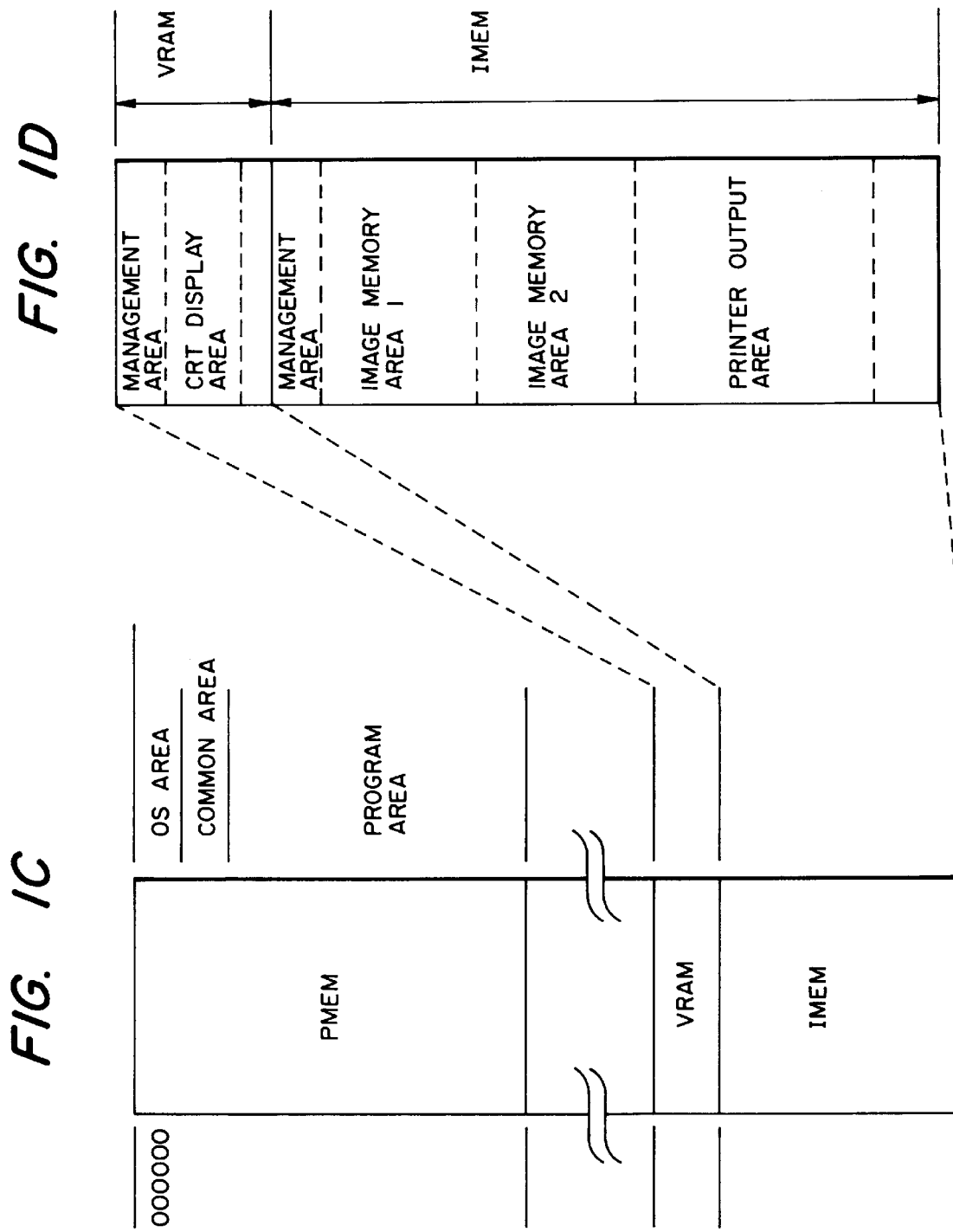

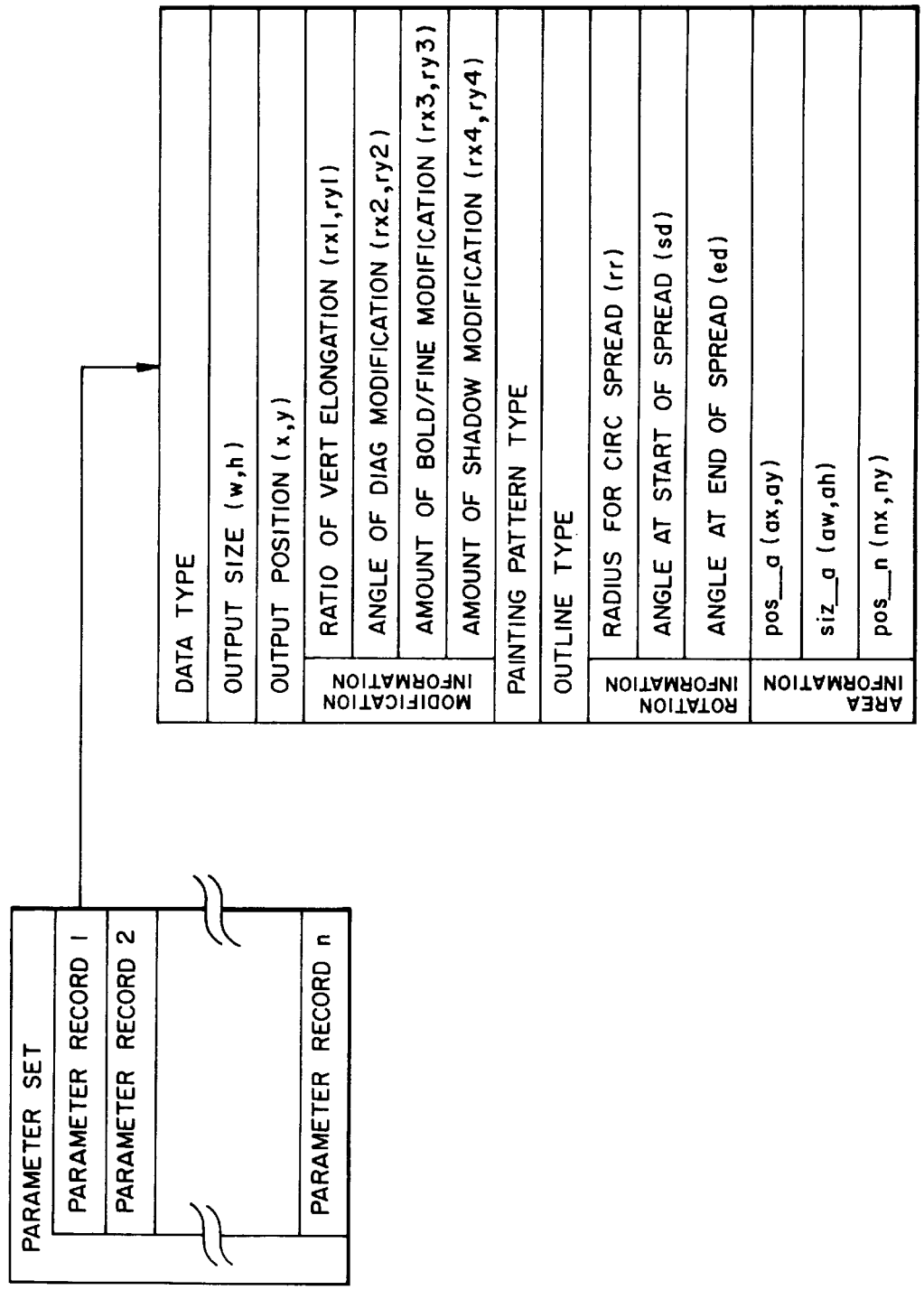

FIG. 3

DEFINITION OF PARAMETERS

| | | | | | OVERLAY | END | CANCEL | |
|---|---|---|---|---|---|---|---|---|
|《 a 》 | TYPEFACE | MIN-CHO | GOTHIC | | | | | |
| 《 b 》 | CHARACTER SIZE | 64 | POINT | | | | | |
| 《 c 》 | SPREAD TYPE | HOR | DIAG | CIRC | | | | |
| 《 d 》 | CHAR ROTATION | NO | YES | | | | 0.0 | ° |
| 《 e 》 | (CHAR OVERLAY SECOND SHEET) | | | | NUMBER OF CHAR OVERLAY | | 3 | SHEETS |
| 《 f 》 | VERT ELONGATION· HOR ELONGATION | NO | VERT | HOR | | | 10 | % |
| 《 g 》 | MIRROR IMAGE INVERSION | NO | X-DIR | Y-DIR | | | | |
| 《 h 》 | ITALIC MODIFICATION | NO | YES | x | 10 ° | y | 14 | ° |
| 《 i 》 | BOLD · FINE | NO | BOLD | FINE | | | 2 | % |
| 《 j 》 | SHADOW | NO | YES | x | 10 mm | y | 5 | mm |
| 《 k 》 | OUTLINE | NO | YES | | LINE WIDTH | | 0.0 | mm |
| 《 l 》 | PAINTING | | | | | | | |

IMAGE PROCESSING SYSTEM

This application is a continuation of application Ser. No. 07/819,650 filed on Jan. 10, 1992, now abandoned, which is a continuation of application Ser. No. 07/405,068 filed on Sep. 7, 1989, now abandoned, which is a continuation of application Ser. No. 06/914,150 filed on Oct. 1, 1986, now abandoned.

BACKGROUND OF THE INVENTION

1. Field of the Invention

The present invention relates to a computer equipped with an image memory, in particular to an apparatus for displaying or printing a visible pattern by generating a dot pattern representing a character or pattern, generating a contour line and/or filling in the internal area of the contour line with black, and to an image processing system for text preparation or pattern processing through these operations. In the present specification, the terms "pattern information", "character information" and "image information" are used with substantially same meaning.

Furthermore, the present invention relates to an image processing system allowing easy editing of prepared image information through simple operations.

2. Related Background Art

In conventional systems in which patterns are stored in the form of dot information in image memories, character generation is generally conducted either by transferring a dot pattern, stored in advance in an auxiliary memory or a read-only memory (ROM), to a display or output unit, or reading out contour data similarly stored, and, after a coordinate conversion, filling in the internal area of said contour with black on the image memory. It has therefore not been possible to obtain characters in various designs such as solid-black characters, white characters on black background, hatched characters or shadowed characters for apparent stereo effect, in combination with character enlargement, reduction, deformation, etc. On the other hand, pattern generation has been achieved by blacking or whitening or hatching the interior of relatively simple patterns such as polygons or circles, and the combination with character generation has been limited to very simple cases.

For this reason, complex effects can only be obtained through a tedious manual procedure independent from text preparation or pattern editing with computer, such as pasting a desired character or pattern, prepared for example by a photographic process, with a desired hatching pattern film, or, for obtaining a shadow effect, pasting two copies of a similarly prepared character or pattern, with a desired distance between them, followed by manual correction.

SUMMARY OF THE INVENTION

In consideration of the foregoing, an object of the present invention is to provide an image processing system capable of generating various modified patterns, from any pattern present on the image memory, in white on black background, in hatched pattern or with shadows, and capable of completing all the operations of character and pattern editing on the computer within a short time.

According to one aspect of the present invention is provided an image processing system provided with plural memory means each capable of storing pattern information in the form of a dot pattern, processing means for determining mutually corresponding dots among said plural memory means and effecting a logic process for each dot, means for display or output of a dot pattern obtained by said processing means, and control means for a combined control of foregoing means according to externally given parameters.

BRIEF DESCRIPTION OF THE DRAWINGS

FIG. 1C is a chart showing a memory map;

FIG. 1D is a chart showing a memory map of VRAM and IMEM shown in FIG. 1C;

FIG. 2 is a chart of parameter settings;

FIG. 3 is a schematic view of a parameter definition frame;

DETAILED DESCRIPTION OF THE PREFERRED EMBODIMENTS

Figure 1A:
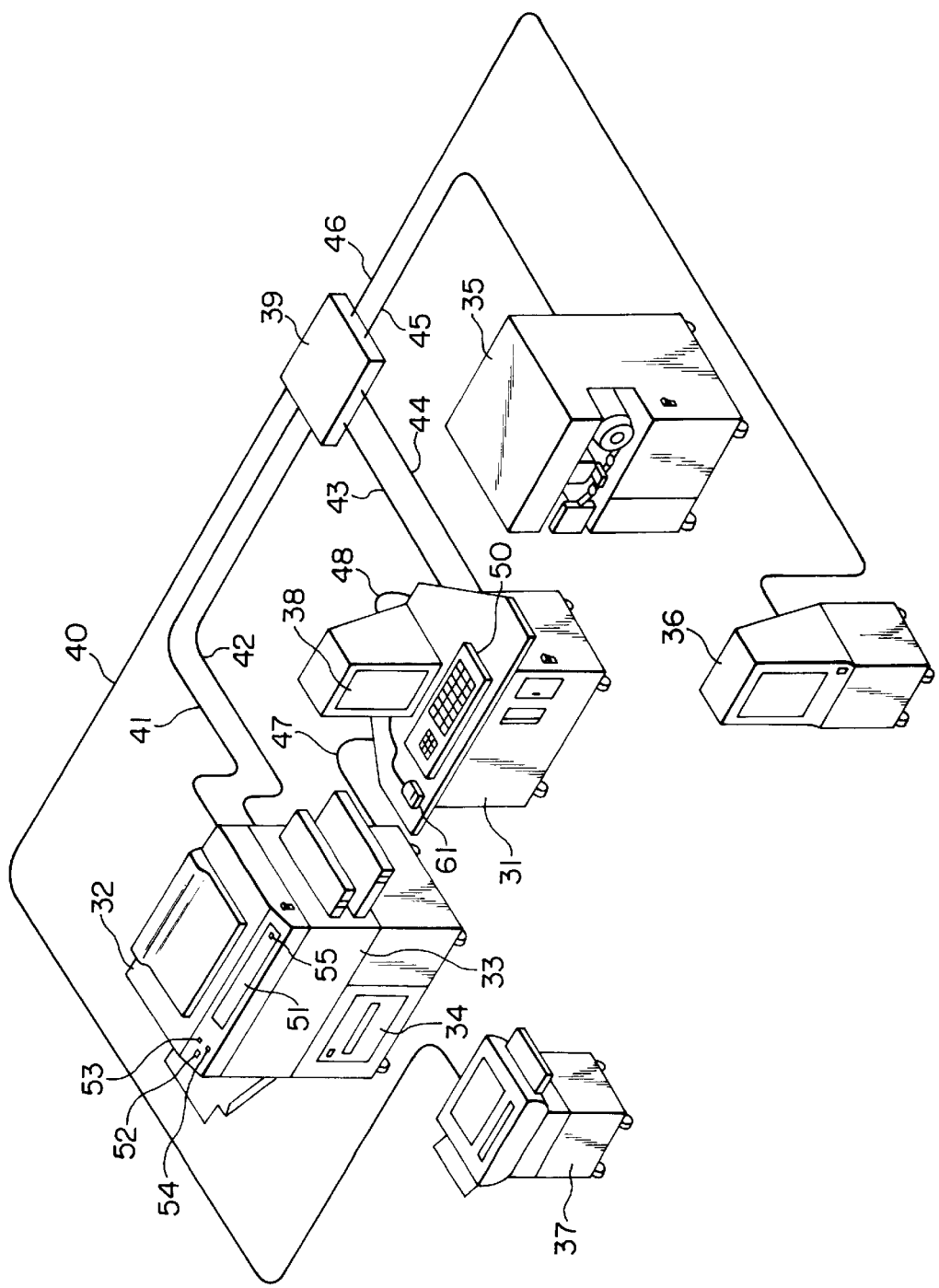
FIG. 1A is an external view showing the connections of the system of the present invention.

Now the present invention will be clarified in greater detail by detailed description of an embodiment thereof shown in the attached drawings. FIG. 1A is an external view of the composition of a system of the present invention. However, the system of the present invention is not necessarily limited to the illustrated example, and the present invention is naturally applicable also to stand-alone equipment or when a part of the system is modified. A control unit or work station 31 is provided with a microcomputer for system control, internal memories composed of a RAM, a ROM, etc., and external memories composed of a floppy disk, a cartridge tape, a memory disk, etc. An original document reader 32 is composed of an input unit of a digital copying machine and is adapted for converting the information of an original document, placed on an original table, into an electrical signal with an image sensor such as a CCD. A high-speed printer 33, for example a laser beam printer, is composed of an output unit of the digital copying machine, and is adapted for image recording on a recording material, according to an electrical information signal. An image file 34 is provided with a memory medium such as an optical or magnetooptical disk and is capable of recording and reading a large amount of image information. A microfilm file 35 is provided with a microfilm retrieval unit and a microfilm reader unit for converting the image information of a retrieved microfilm frame into an electrical signal with an image sensor. A printer 37 can be composed for example of a laser beam printer similar to the printer 33, but is smaller and slower in speed and is installed when required. A cathode ray tube unit 38 constitutes a display unit for text and image processing and displays image information photoelectrically read by the reader of the digital copying machine or the microfilm file, or control information of the system. A selector unit 39 selects the connections of various units according to a signal from the control unit 31. Cables 40 to 48 are provided for electrically connecting various units. A keyboard 50, provided on the control unit 31, is used for entering various commands to the system. A pointing device 61, for selecting commands for image processing on the cathode ray tube 38, is used for moving a cursor to select a command from a command menu. An operation panel 51, for controlling the digital copying machine, is provided with keys for setting copy number, image magnification etc., a copy start key 55 and a numeral display unit. A mode selector switch 52 determines whether the digital copying machine is started by said machine or by the control unit 31, and the mode selected by said switch 52 is displayed by light-emitting diodes 53, 54.

Figure 1B:
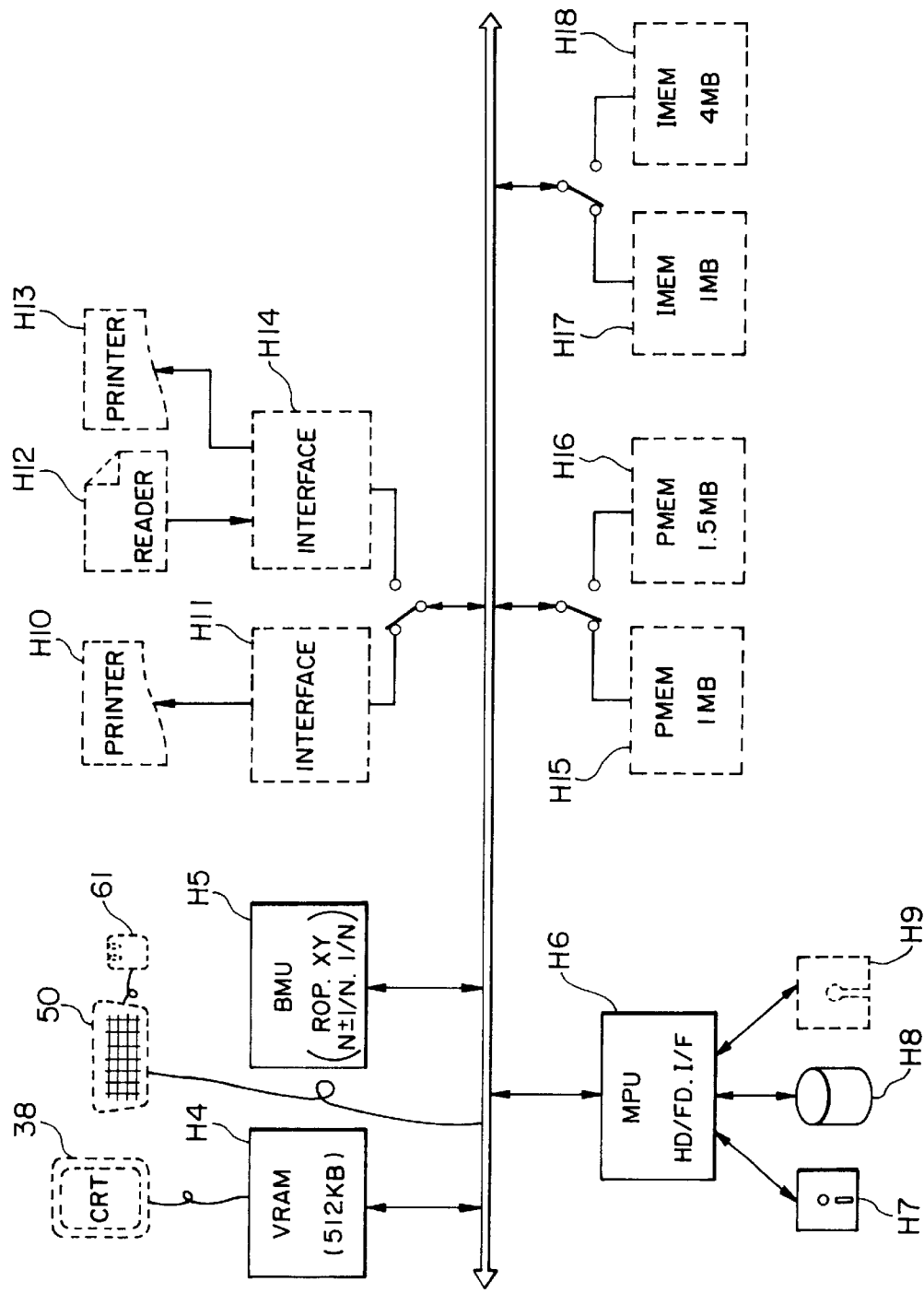
FIG. 1B is a block diagram of the system of the present invention.

FIG. 1B is a block diagram of the image processing system. In the present text, the image editing is assumed to include text editing. In FIG. 1B, the same components as those in FIG. 1A are represented by the same numbers or symbols. A video random access memory (VRAM) H4 stores data to be displayed on the display unit 38, developed on a bit map. For example, for a character code, corresponding character data are stored in the VRAM H4 and can be displayed under software control.

There are provided disks H7, H8 and H9 for data filing, in which H8 can be composed for example of a rigid disk, and H7 can be composed for example of a 5.25" floppy disk.

Bit Manipulation Unit

A bit manipulation unit (BMU) H5 has a function of direct memory access controller (DMAC) for direct data transfer in units of words among the input and output units such as the VRAM H4, main memory, disks H7, H8 and H9 and printer, without passing through a microprocessor unit (MPU) to be explained later, and is further capable of the following sixteen logic functions, on source data A and destination data B: $\overline{A}$ (inversion), $\overline{AB}$, $\overline{A}$+B, logical 1 (black out), $\overline{A+B}$, $\overline{B}$, $\overline{A+B}$, A+$\overline{B}$, $\overline{AB}$, A+B (OR), B, A+B, logical 0 (clear), $\overline{AB}$, AB (AND) and A.

Microprocessor Unit

A microprocessor unit (MPU) H6 is provided with an interface HD/FD-IF for the access control of the above-mentioned disks H7, H8 and H9 and memories PMEM, IMEM to be explained later.

Printer and Reader

In FIG. 1B there are provided printers H10, H13 of different pixel densities, a reader H12 for reading the original document, an interface H11 for the printer H10 and another interface H14 for the printer H13 and the reader H12.

Program Memory and Image Memory

Program memories (PMEM) H15, H16 store editing programs suitably selected from the rigid disk H8. Data entered from the keyboard 50 are stored, in the form of code information, in the main memory functioning also as a text memory. Data stored in the main memory, those stored in the disks and those read from the reader unit can be expanded, in the form of bit data, in an image memory IMEM. The data stored in the program memory PMEM can be likewise expanded and can be subjected to the aforementioned direct memory access control by the bit manipulation unit (BMU). FIG. 1C schematically shows the memory map in the program memory H15 or H16. As shown in FIG. 1C, the program memory is divided, for example, into an operation system (OS) area, a common area and a program area.

In the following there will be detailedly explained an example of text-image processing in the above-explained system.

At first there will be explained the parameters to be prepared in advance. FIG. 2 shows a set of parameters of the present image processing system, which are designated in a parameter definition frame of a pattern editing program, shown in FIG. 3.

Parameters

In FIG. 3, a type face parameter [a] designates the type of data stored in advance in an auxiliary memory (hereinafter called original data). In the present example, the original data contain coordinate values of characteristic points or sampled points on the contour of pattern. A parameter [b] indicates the standard output size of characters, which can in principle be enlarged or reduced to any size. A parameter [c] designates the method of spreading, or the direction of characters, for example horizontal, diagonal or circular. A parameter [d] designates the angle of rotation of each character in any spreading method designated by the parameter [c]. A parameter [e] designates a character overlay, indicating the number of overlaid outputs, according to a parameter setting for each character output position, to be determined in a program step 2 to be explained later in relation to FIG. 4. Parameters [f], [g], [h] and [i] designate coordinate conversions for modifying the form of the original data stored in advance for example in the auxiliary memory. Said parameters respectively designate the presence or absence and the amount of modification for obtaining a vertical or horizontal elongation, a mirror image inversion, an Italic character and a bold or fine character. A parameter [j] designates the presence or absence and the amount of a shadow effect on the data modified by the parameters [f], [g], [h] and [i]. A parameter [k] designates the presence or absence and the thickness of a contour generation on the modified data. A parameter [l] designates the area inside the pattern contour, either no pattern, white, black or other various hatchings.

Parameter Set

As shown in FIG. 2, the parameter set can have plural series of parameters as parameter records of a number designated by the above-mentioned parameter [e]. The parameter set is stored in the common area of the program memory H16, shown in FIG. 3, and is referred to by the control unit of the image processing system.

Image Memory Area

A feature of the present invention lies in the presence of plural memory means each capable of storing pattern information in the form of a dot pattern. FIG. 1D shows an example in which internal memory areas (image memory areas 1 and 2) are formed in the image memory IMEM, while an output area is formed in the video random access memory VRAM (cathode ray tube display area) and in the image memory IMEM (printer output area). The internal memory area can be dynamically controlled by the control unit of the present image processing system, in the following manner.

Figure 1E:
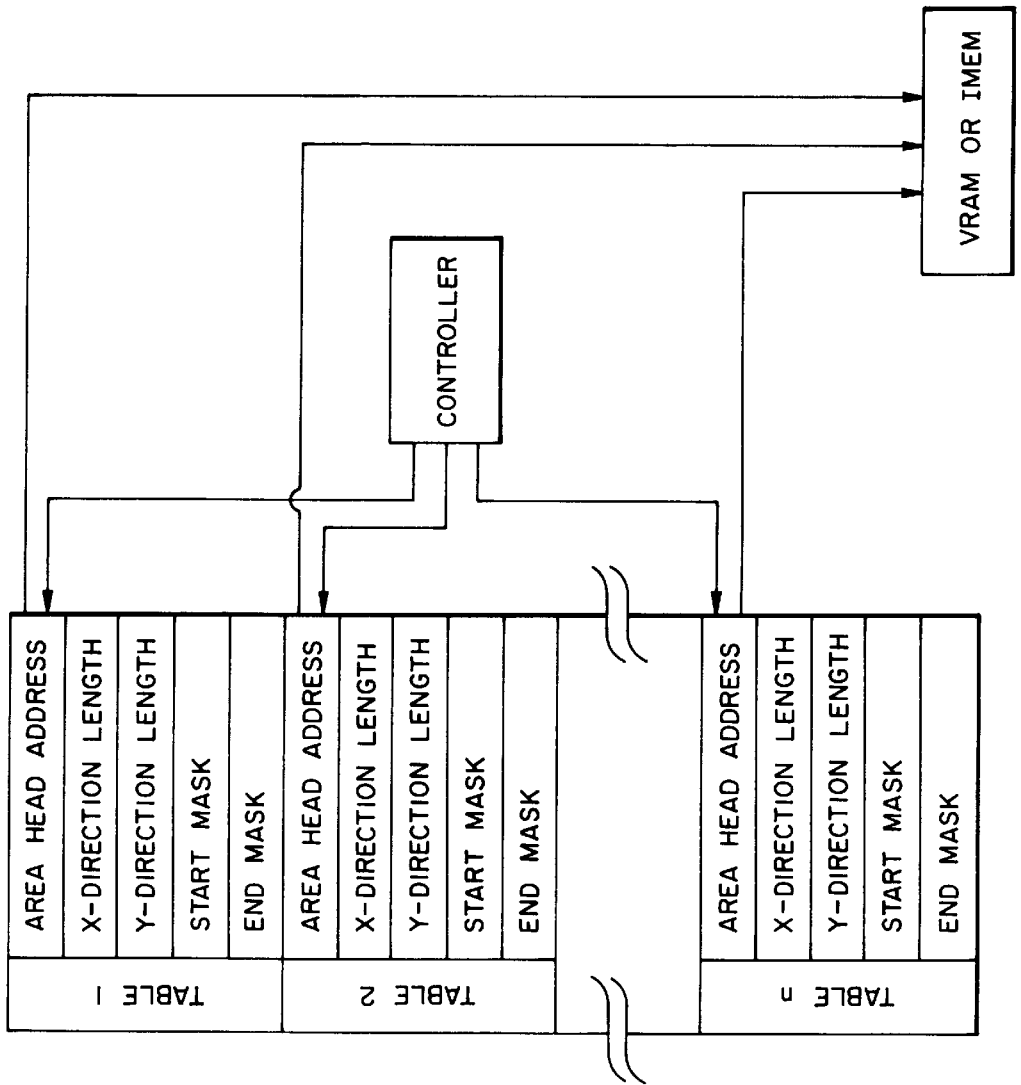
FIG. 1E is a chart of an image memory area control table.

The image memory areas 1 and 2 are selected as of a same size, which is determined by the type of output area and the output size. For each area the horizontal and vertical sizes are set on an image memory control table, and the control unit calculates the actual address in the memory in response to an area designation and a designation of an offset coordinate (x, y), taking the start address of said designated area as (0, 0). Also the amount of memory transfer is converted into the byte size on the actual memory through the designation of the dot size (w, h). Data transfer between image memory areas can be achieved at a high speed through the bit manipulation unit H5, by setting these values in a register. FIG. 1E shows the image memory area control table.

Control Unit

Figure 4:
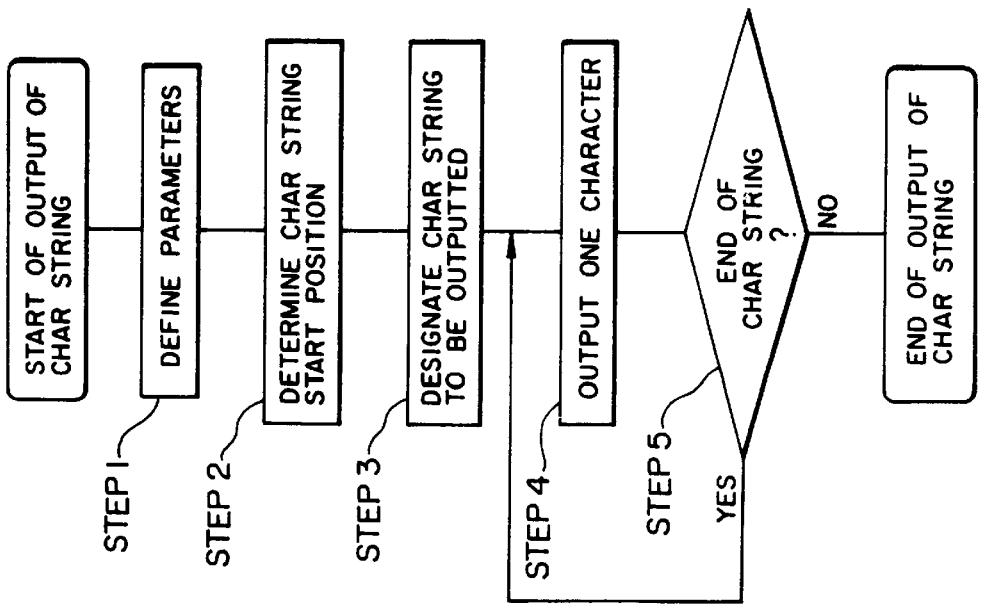
FIG. 4 is a schematic flow chart of a control sequence.

FIG. 4 is a schematic flow chart, for the control unit of the present image processing system, stored in the program memory H16. A step 1 executes definition of the aforementioned parameters, to be stored in the parameter set shown in FIG. 2. A step 2 determines the start position of a row of characters, by means of the cathode ray tube device 38 and the pointing device 61 for designating an arbitrary point on said cathode ray tube, according to a pattern editing program, for example in the following manner. In a case of horizontal spreading or diagonal spreading, there are designated two points, i.e., a starting point of spreading and a point in the direction of spreading. In a case of circular spreading, there are designated a start point of spreading and two points for defining a desired circle. A step 3 designates, in one input, the kind of output characters required, for example in conversion from kana (phonetic) characters to kanji (symbolic) characters, or in conversion from character code to characters. Steps 4 and 5 cause the output of said characters according to the defined parameter set.

Figure 5:
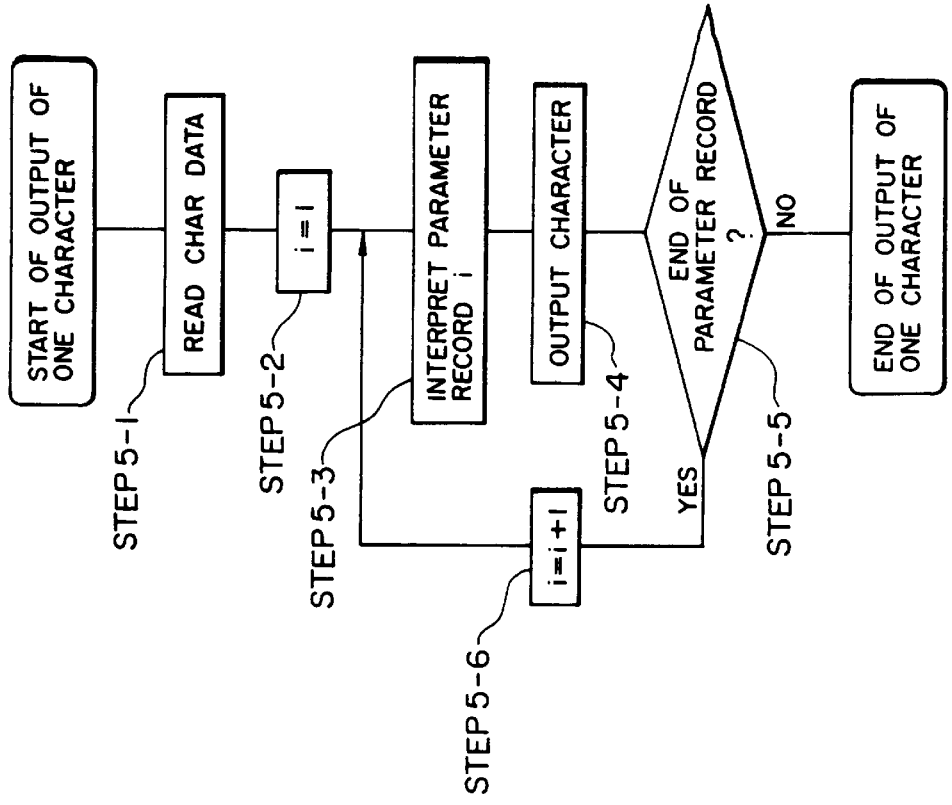
FIGS. 5 and 6 are detailed flow charts of the control sequence.

FIG. 5 is a flow chart concerning the output of each character in the above-mentioned step 4. A step 5-1 reads designated data, for example, from the auxiliary memory. Steps 5-2, 5-5 and 5-6 administer the parameter record constituting the parameter set, and decode, in succession, the parameter record shown in FIG. 2. A step 5-4 processes the read original data according to each parameter record shown in FIG. 2. More specifically there are conducted determination of the dots corresponding between said image memory areas, selection of logic processing and data transfer to the output area.

Figure 6:
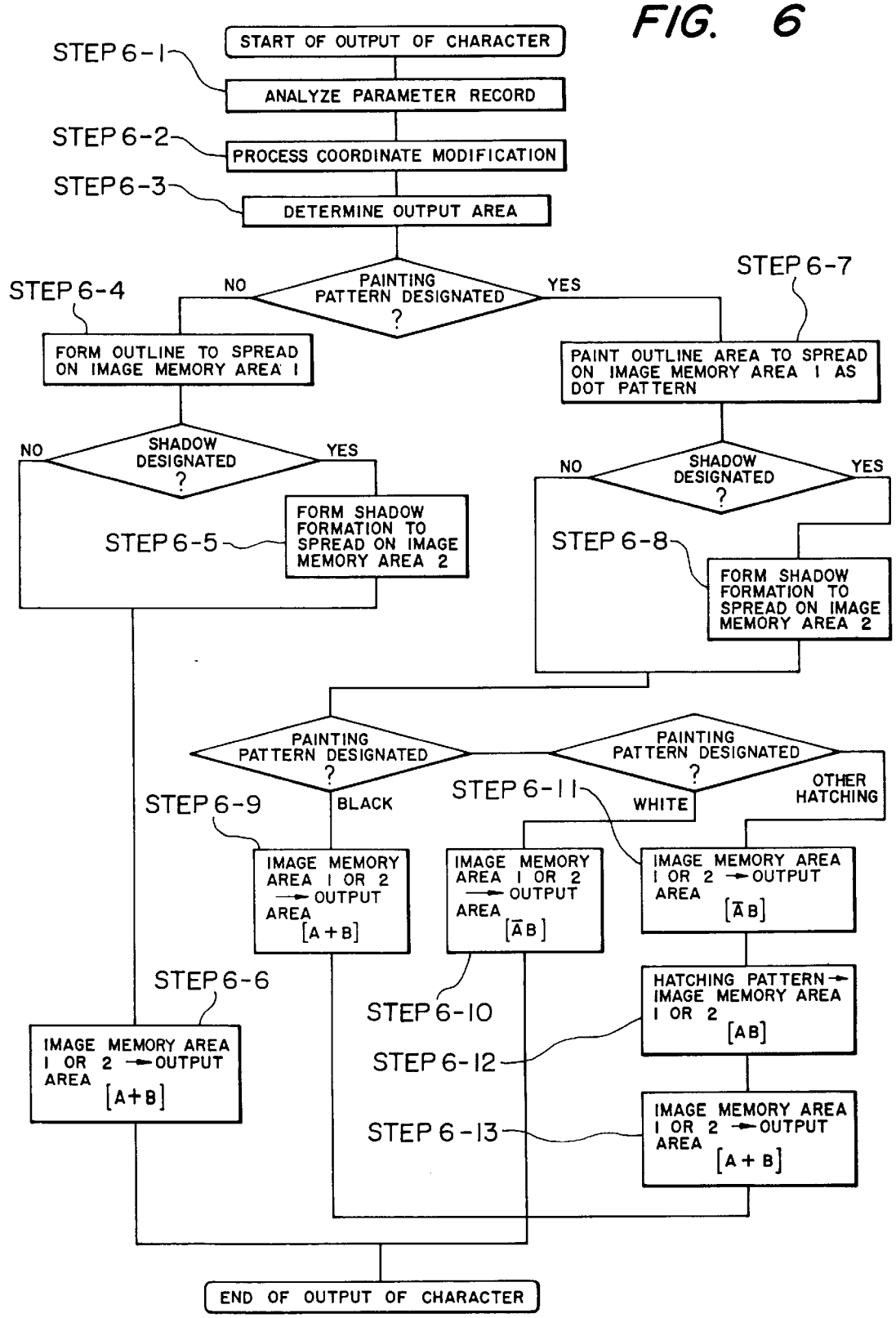

FIG. 6 is a detailed flow chart for character output in the above-mentioned step 5-4. A step 6-1 analyzes the parameter record and sets the obtained values in the internal memory of the control unit. A step 6-2 is for coordinate deformation and effects coordinate conversion on the original data, read in the step 5-1, according to the aforementioned parameters [f], [g], [h] and [i] shown in FIG. 3. A step 6-3 determines the output area in the cathode ray tube display area or the printer output area, according to the start position designated in the step 2 in FIG. 4, output size and all deformation parameters.

Designation of interior paint mode (interior filling) follows two separate flows according to whether such mode is designated or not. In case such mode is not designated, a step 6-4 generates a contour line of data alone, and selects the image memory area 1 for spreading said contour. On the other hand, in case such mode is designated, a step 6-7 fills in or paints the interior of the contour of the character data and spreads said pattern on the image memory area 1.

Shadow Generation

Steps 6-5 and 6-8 generate a shadow when a shadow generation is designated by the parameter [j]. The shadow generation is achieved by repeating data transfer to the image memory area 2 by displacing the destination coordinate (x, y) of data transfer in succession, utilizing the logic function [A+B] of the bit manipulation unit H5. Said destination coordinate (x, y) is calculated by determining the number of dots of transfer (sx, sy) on the image memory area from the parameters [b] and [j], and determining values of x and y satisfying conditions $0 \leq x \leq sy$ and $0 \leq y \leq sy$ in the case $0 \leq sx$ and $0 \leq sy$ according to a symmetrical digital differential analysis algorithm.

Transfer to Output Area

In the case that the interior paint mode is not designated by the parameter [1], a step 6-6 transfers the dot pattern in the image memory area 2 or 1, respectively, according to the presence or absence of designation of shadow generation, to an output area determined in the step 6-3, by means of a logic function [A+B] of the bit manipulation unit. If black paint mode is designated, a step 6-9 transfers the dot pattern stored in the image memory area 2 or 1, according to the presence or absence of designation of shadow generation, to an output area determined in the step 6-3, by means of a logic function [A+B] of the bit manipulation area. On the other hand, if white paint mode is designated, a step 6-10 transfers the dot pattern stored in the image memory area 2 or 1, according to the presence or absence of designation of shadow generation, to an output area determined in the step 6-3, by means of a logic function $[\overline{AB}]$ of the bit manipulation unit. In the case that hatching paint mode is designated, a step 6-11 executes a process the same as in the step 6-10, thus making a white interior in the output pattern on the output area, then a step 6-12 applies a designated hatching pattern mask on the dot pattern stored in the image memory area 2 or 1, according to the presence or absence of designation of shadow generation, by a logic function [AB] of the bit manipulation unit, and transfers the pattern to an output area determined by the step 6-3 by means of a logic function [A+B] of the bit manipulation unit.

Examples of Operations

Figure 7:
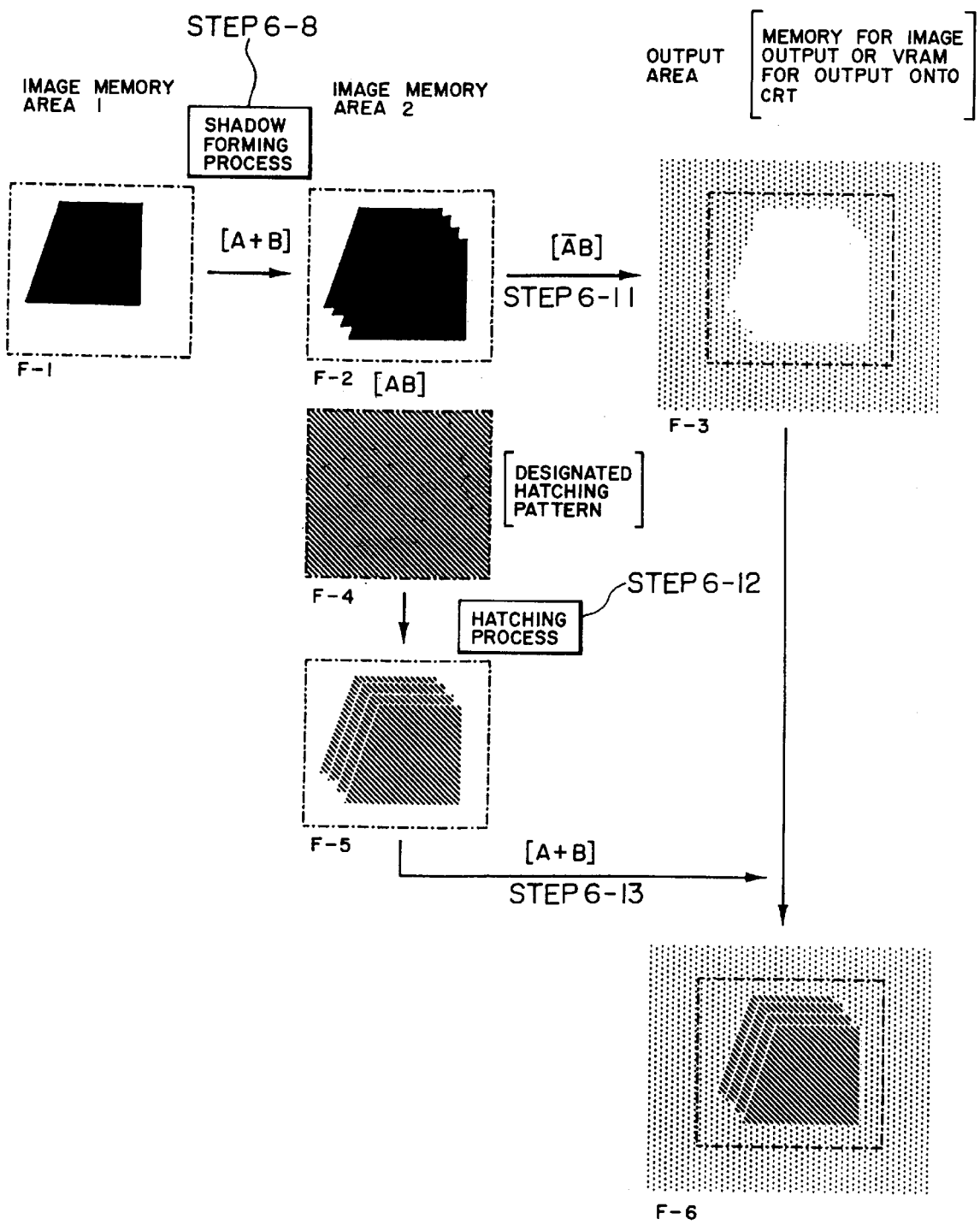
FIGS. 7 and 8 are schematic illustration of operations conducted on the system of the present invention.

As an example, FIG. 7 illustrates the operations in the above-explained steps 6-8, 6-11, 6-12 and 6-13, wherein the parameters designate a shadow generation and a hatching process. F-1 indicates a dot pattern on the image memory area 1, of which interior is painted black in the step 6-7. F-2 shows the result of successive transfers with successively displaced destination coordinate in the shadow generation of the step 6-8. In F-2, F-3, F-5 and F-6 the pitch of displacement is shown large for the purpose of explanation, but said pitch can be reduced to the unit of minimum dot present on the memory. F-3 indicates the area of output pattern on the output area, painted white in advance by the step 6-11. Then a hatching pattern F-4 designated in the step 6-12 is applied to obtain a pattern F-5. F-6 indicates a state obtained by transferring the pattern F-5 to the output area in the step 6-13.

Figure 8:
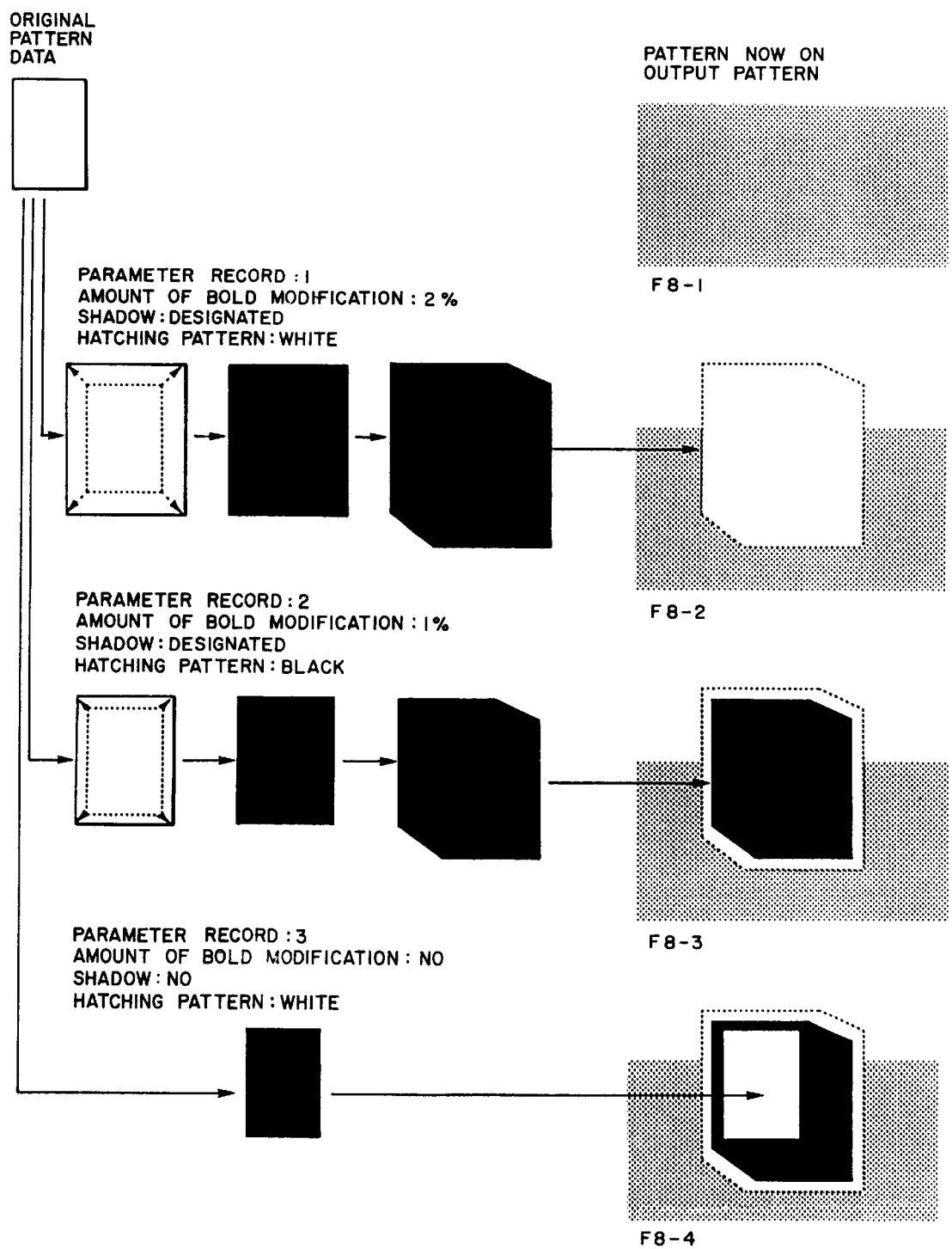

FIG. 8 schematically shows an example of analyzing plural parameters in the parameter set and providing overlaid outputs, in a same position, of characters or patterns of different deformations. In this example a pattern existing in the output area is edged along the contour of a desired output character and a character with a shadow is released. In this case the parameter [e] in FIG. 3 designates three overlays. For the first image there are designated an amount of bold=2%, an amount of shadow=(x,y) and a white hatching pattern. For the second image there are designated an amount of bold=1%, an amount of shadow=(x,y) and a black hatching pattern. For the third image there are designated an amount of bold=0%, no shadow and a white hatching pattern. These definitions for the first, second and third images are respectively set in the parameter records 1, 2 and 3 shown in FIG. 2. F8-1 indicates a pattern already existing in the output area. F8-2 indicates the result of output obtained by analyzing the parameter record 1. Said result is obtained by an enlargement in the step 5-1 shown in FIG. 5, followed by the steps 6-7, 6-8, and 6-10 shown in FIG. 6. F8-3 and F8-4 respectively show the results of outputs obtained by analyzing the parameter records 2 and 3. F8-3 is obtained by an enlargement of the pattern of F8-2, followed by the steps 6-7, 6-8 and 6-9 shown in FIG. 6. A white area around the pattern in F8-3 is obtained as the result of difference in enlargements in F8-2 and F8-3. F8-4 shows the result of output of a character for all the parameter records set by the definition of the parameter. More specifically said result is obtained, after proceeding from F8-2 to F8-3, by following a flow, in FIG. 6, of the step 6-7, discrimination of absence of shadow generation, and the step 6-10.

The foregoing explanation has been limited to a general case of obtaining a shadowed character, but it is also possible to obtain other various outputs since the parameters shown in FIG. 3 can be independently designated with respect to the parameters [f], [g], [h], [i], shadow process, outline process and interior paint mode. Also the number of parameter records in the parameter set is not limited in principle.

As explained in the foregoing, the present invention enables to obtain complex combinations of characters and patterns which have not been obtainable with conventional text preparation and pattern processing system utilizing a computer with an image memory.

The present invention provides the advantages of obtaining various painted patterns from the data obtained by various deformations of a wide range from original data; easily obtaining shadow effect; giving an aesthetic factor to the text preparation or pattern editing by repeated outputs of characters; and allowing combination with any pattern already existing in the image memory. These results can be obtained as printouts of high quality by a digital printer of a high resolving power connected to the system of the present invention. Also the system of the present invention can meet, with a high speed and a high quality, to the requirements of preparation of title characters, advertising leaflets or other printings involving aesthetic designs, which have necessitated significant labor in preparation.

As explained in the foregoing, it is rendered possible to obtain an image processing system provided with plural memory means each capable of storing pattern information in the form of a dot pattern, processing means for determining mutually corresponding dots among said plural memory means and effecting a logic process for each of said dots; means for display or output of a dot pattern obtained by processing with said processing means, and means for combined control of the foregoing means.

What is claimed is:

1. A character processing apparatus comprising:

memory means for storing coordinate information representing an outline of a character;

control means for controlling a display device to display a menu for designating one or more of a plurality of types of character modification processes to be applied to a character, the menu further displaying at least one character painting pattern;

conversion means for converting the coordinate information stored in said memory means in accordance with a plurality of parameters for one or more of the types of character modification processes designated by using the menu to provide converted coordinate information; and generating means for painting the converted coordinate information with one of the at least one character painting pattern designated by using the menu to generate the character having the one or more designated types of character modification processes applied thereto and as painted with the one designated character painting pattern.

2. An apparatus according to claim 1, further comprising print means for printing the character generated by said generating means.

3. An apparatus according to claim 1, further comprising display means for displaying the character generated by said generating means.

4. An apparatus according to claim 1, wherein the plurality of types of character modification processes included processes of vertically or horizontally elongating a character, mirror-image inverting a character, and making a character oblique, narrowed or thickened.

5. A character processing method using a memory which stores coordinate information representing an outline of a character, comprising the steps of:

controlling a display device to display a menu for designating one or more of a plurality of types of character modification processes to be applied to a character, the menu further displaying at least one character painting pattern;

converting the coordinate information stored in the memory in accordance with a plurality of parameters for one or more of the types of character modification processes designated using the menu to provide converted coordinate information; and painting the converted coordinate information with one of the at least one character painting pattern designated by using the menu to generate the character having the one or more designated types of character modification processes and as painted with the one designated character painting pattern.

6. A method according to claim 5, further comprising the step of printing the generated character.

7. A method according to claim 5, further comprising the step of displaying the generated character.

8. A method according to claim 5, wherein the plurality of types of character modification processes include processes of vertically or horizontally elongating a character, mirror-image inverting a character, and making a character oblique, narrowed or thickened.

9. A computer-readable storage medium that stores program codes for performing a character processing method using a memory which stores coordinate information representing an outline of a character, said method comprising the steps of:

controlling a display device to display a menu for designating one or more of a plurality of types of character modification processes to be applied to a character, the menu further displaying at least one character painting pattern;

converting the coordinate information stored in the memory in accordance with a plurality of parameters for one or more of the types of character modification processes designated using the menu to provide converted coordinate information; and painting the converted coordinate information with one of the at least one character painting pattern designated by using the menu to generate the character having the one or more designated types of character modification processes and as painted with the one designated character painting pattern.

10. A storage medium according to claim 9, wherein said method further comprises the step of printing the generated character.

11. A storage medium according to claim 9, wherein said method further comprises the step of displaying the generated character.

12. A storage medium according to claim 9, wherein the plurality of types of character modification processes include processes of vertically or horizontally elongating a character, mirror-image inverting a character, and making a character oblique, narrowed or thickened.

* * * * *

UNITED STATES PATENT AND TRADEMARK OFFICE
CERTIFICATE OF CORRECTION

PATENT NO. : 5,923,314
DATED : July 13, 1999
INVENTOR(S) : KUNIO SETO, ET AL.

It is certified that error appears in the above-identified patent and that said Letters Patent is hereby corrected as shown below:

COLUMN 1

Line 61, "invention is" should read --invention, there is--.

COLUMN 5

Line 10, "example" should read --example,--.

COLUMN 7

Line 64, "included" should read --includes--.

Signed and Sealed this

First Day of February, 2000

Attest:

Q. TODD DICKINSON

*Attesting Officer*   *Acting Commissioner of Patents and Trademarks*